United States Patent
Du et al.

(10) Patent No.: US 11,204,765 B1
(45) Date of Patent: Dec. 21, 2021

(54) DEFERRED GPR ALLOCATION FOR TEXTURE/LOAD INSTRUCTION BLOCK

(71) Applicant: QUALCOMM Incorporated, San Diego, CA (US)

(72) Inventors: Yun Du, San Diego, CA (US); Fei Wei, San Diego, CA (US); Gang Zhong, San Diego, CA (US); Minjie Huang, San Diego, CA (US); Jian Jiang, San Diego, CA (US); Zilin Ying, San Diego, CA (US); Baoguang Yang, Fremont, CA (US); Yang Xia, San Diego, CA (US); Jing Han, San Jose, CA (US); Liangxiao Hu, San Diego, CA (US); Chihong Zhang, San Diego, CA (US); Chun Yu, Rancho Santa Fe, CA (US); Andrew Evan Gruber, Arlington, MA (US); Eric Demers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/003,600

(22) Filed: Aug. 26, 2020

(51) Int. Cl.
*G06F 9/30* (2018.01)
*G06F 9/38* (2018.01)
*G06T 1/20* (2006.01)
*G06F 9/50* (2006.01)

(52) U.S. Cl.
CPC ........ *G06F 9/30043* (2013.01); *G06F 9/3836* (2013.01); *G06F 9/5027* (2013.01); *G06T 1/20* (2013.01)

(58) Field of Classification Search
CPC .................................................. G06F 9/30043
See application file for complete search history.

(56) References Cited

U.S. PATENT DOCUMENTS

| | | | |
|---|---|---|---|
| 2015/0324949 A1* | 11/2015 | Alsup | G06F 9/3836 345/522 |
| 2017/0139707 A1* | 5/2017 | Jang | G06T 1/60 |
| 2018/0210732 A1* | 7/2018 | Zhu | G06F 9/50 |
| 2020/0312006 A1* | 10/2020 | Du | G06T 1/20 |

* cited by examiner

*Primary Examiner* — Michael J Metzger
(74) *Attorney, Agent, or Firm* — Procopio, Cory, Hargreaves & Savitch (57) ABSTRACT

A graphics processing unit (GPU) utilizes block general purpose registers (bGPRs) to load multiple waves of samples for an instruction group into a processing pipeline and receive processed samples from the pipeline. The GPU acquires a credit for the bGPR for execution of the instruction group for a first wave using a persistent GPR and the bGPR. The GPU refunds the credit upon loading the first wave into the pipeline. The GPU executes a subsequent wave for the instruction group to load samples to the pipeline when at least one credit is available and the pipeline is processing the first wave. The GPU stores an indication of each wave that has been loaded into the pipeline in a queue. The GPU returns samples for a next wave in the queue from the pipeline to the bGPR for further processing when the physical slot of the bGPR is available.

20 Claims, 8 Drawing Sheets

| Man3.1 Gaussian post-processing shader | |
|---|---|
| | 0[4730c904_00002000] (rpt1)bary.f (ei)hr1.x, (r)0, r0.x; 302 |
| | 1[00000100_00000000] (rpt1)nop ; |
| Pre-sample | 12[40004001_10250005] add.f r0.y, hr1.y, hc9.y ; |
| | 13[a0c00f0a_0000000b] sam (f16)(xyzw)hr2.z, r1.y, s#0, t#0; 304 |
| | 14[20044400c_00000000] mov.f32f32 r3.x, r0.x; |
| | 15[20044400d_00000009] mov.f32f32 r3.y, r2.y; |
| | 16[40004009_10260005] add.f r2.y, hr1.y, hc9.z; |
| | 17[a0c00f0e_0000000f] sam (f16)(xyzw)hr3.z, r1.w, s#0, t#0; ...... |
| | 45[a0c00f34_00000035] sam (f16)(xyzw)hr13.x, r6.z, s#0, t#0; |
| | 46[00000000_00000000] nop; |
| Issue 13 samples | 47[a0c00f00_00000001] sam (f16) (xyzw) hr0.x, r0.x, s#0, t#0; |
| | 48[73050104_10409020] (sy) (rpt1)mad.f16 hr1.x, hc12.x,(r)hr2.z, hc16.x; 306 |
| | 49[630601a_10409030] (rpt1)mad.f16 hr2.z, hc12.x, (r)hr3.x, hc16.x; |
| | 50[63070104_20049031] (rpt1)mad.f16 hr2.z, hc12.y, (r)hr3.z, (r)hc1.x; ...... |
| | 61[63180304_20049f03a] (rpt3)mad.f16 hr1.x, hc14.z, (r)hr12.x, (r)hc1.x; |
| | 62[631a0304_20049f03b] (rpt3)mad.f16 hr1.x, hc14.w, (r)hr13.x, (r)hc1.x; |
| | 63[63000300_20049f03c] (rpt3)mad.f16 hr0.x, hc15.x, (r)hr0.x, (r)hc1.x; |
| Post processing | 64[03000000_00000000] end; | bGPR_alloc_start  
bGPR_alloc_end  
bGPR_use_start  
bGPR_use_end

DEFERRED GPR ALLOCATION FOR TEXTURE/LOAD INSTRUCTION BLOCK

BACKGROUND

Technical Field

The present disclosure relates generally to processing systems, and more particularly, to a processing system with deferred general purpose register (GPR) allocation for texture/load instruction blocks.

INTRODUCTION

Computing devices often perform graphics processing (e.g., utilizing a graphics processing unit (GPU)) to render graphical data for display by the computing devices. Such computing devices may include, for example, computer workstations, mobile phones such as smartphones, embedded systems, personal computers, tablet computers, and video game consoles. GPUs are configured to execute a graphics processing pipeline that includes one or more processing stages which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A device that provides content for visual presentation on a display may utilize a GPU.

A GPU may include general purpose registers (GPRs) that may be utilized for temporary storage for processing. The number of GPRs may be limited and the GPU may incur latency waiting for GPRs to become available or performing memory fetch operations to load the GPRs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus are provided. The apparatus may be a graphics processing unit (GPU). The apparatus may include a memory and at least one processor coupled to the memory. The at least one processor may be configured to identify an instruction group that loads samples to a pipeline for processing texture samples, the instruction group configured to operate on a plurality of waves of samples. The at least one processor may be configured to allocate a persistent GPR (pGPR) for each wave of the instruction group in a first segment of a GPR space. The at least one processor may be configured to allocate one or more block GPR (bGPR) for multiple waves of the instruction group in a second segment of the GPR space, each of the one or more bGPR associated with a credit and a physical slot. The at least one processor may be configured to acquire a credit for the one or more bGPR for execution of the instruction group for a first wave using the pGPR for the first wave and a bGPR of the one or more bGPR to load samples of the first wave to the pipeline. The at least one processor may be configured to refund the credit for the one or more bGPR upon loading the first wave into the pipeline. The at least one processor may be configured to execute a subsequent wave for the instruction group to load samples to the pipeline when at least one credit is available and the pipeline is processing the first wave. The at least one processor may be configured to store an indication of each wave that has been loaded into the pipeline in a queue. The at least one processor may be configured to return samples for a next wave in the queue from the pipeline to the one or more bGPR for further processing when the physical slot of the one or more bGPR is available.

In some implementations, the queue stores a wave identifier and a validity status. The at least one processor is configured to set the validity status of the next wave in the queue to valid in response to the physical slot of the one or more bGPR being available when the pipeline returns processed texture samples for the next wave. The at least one processor is configured to load the texture samples for the next wave in the queue from the pipeline into the one or more bGPR. The at least one processor is configured to process the texture samples in the one or more bGPR according to the instruction group. The at least one processor is configured to remove the next wave in the queue from the queue and indicate the one or more bGPR is available in response to completing the processing of the texture samples.

In some implementations, the one or more bGPR include at least two bGPR, and the further processing is performed in parallel for at least two waves using the at least two bGPR.

In some implementations, the one or more bGPR include sub-bGPR slots. The at least one processor is configured to return samples for a next wave in the queue from the pipeline the one or more bGPR and perform the further processing in parallel for the next wave.

In some implementations, the instruction group includes pre-processing instructions configured to acquire the one credit, pipeline issuing instructions configured to refund the credit, and post processing instructions configured to determine availability of the physical slot of the bGPR.

In some implementations, the instruction group is a shader.

In some implementations, the at least one processor is configured to acquire the credit for the one or more bGPR for execution of the instruction group by: determining whether a credit count for the one or more bGPR is greater than zero; and reducing the credit count by one when the credit count is greater than zero. An initial value of the credit count is equal to a number of the one or more bGPR.

In some implementations, the at least one processor is configured to wait to start execution of the instruction group for the first wave when the credit count is zero.

In some implementations, the at least one processor is configured to determine a number of waves for the group of instructions based on a size of the GPR space, a size of the pGPR, a size of the bGPR, and a number of samples.

In some implementations, the apparatus is a wireless communication device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various

DETAILED DESCRIPTION

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In a processing system, a general purpose register (GPR) space may be a hardware constraint that imposes limits on processing capability. GPRs may be utilized to store data such as samples for processing. For example, a shader may issue samples to a processing pipeline to perform a particular operation such as texture shading. GPRs may store texture samples during pre-processing before the samples are issued to the pipeline and store processed samples during post-processing. A conventional processing system may allocate a GPR for a sample for the pre-processing, issuance, and post-processing to ensure that the GPR is available when the processed sample is returned from the processing pipeline. Such allocation may result in the size of the GPR space imposing a limit on a number of samples that can be processed in parallel.

According to an aspect of the present disclosure, a credit system may allow a block GPR (bGPR) to be allocated to one or more subsequent waves of samples while a first wave of samples is being processed by the pipeline. Multiple waves may be pushed into the pipeline using the same bGPR and a queue may track the waves in the pipeline. When the pipeline returns a wave of samples (e.g., processed samples), the returned samples may be loaded into the available bGPR. If sufficient bGPRs are allocated, the returned samples may be loaded into the bGPRs without waiting. By utilizing a bGPR for multiple waves in the pipeline, the processing system may reduce a GPR footprint for an instruction group (e.g., a shader) and/or improve latency associated with memory fetch operations.

Figure 1:
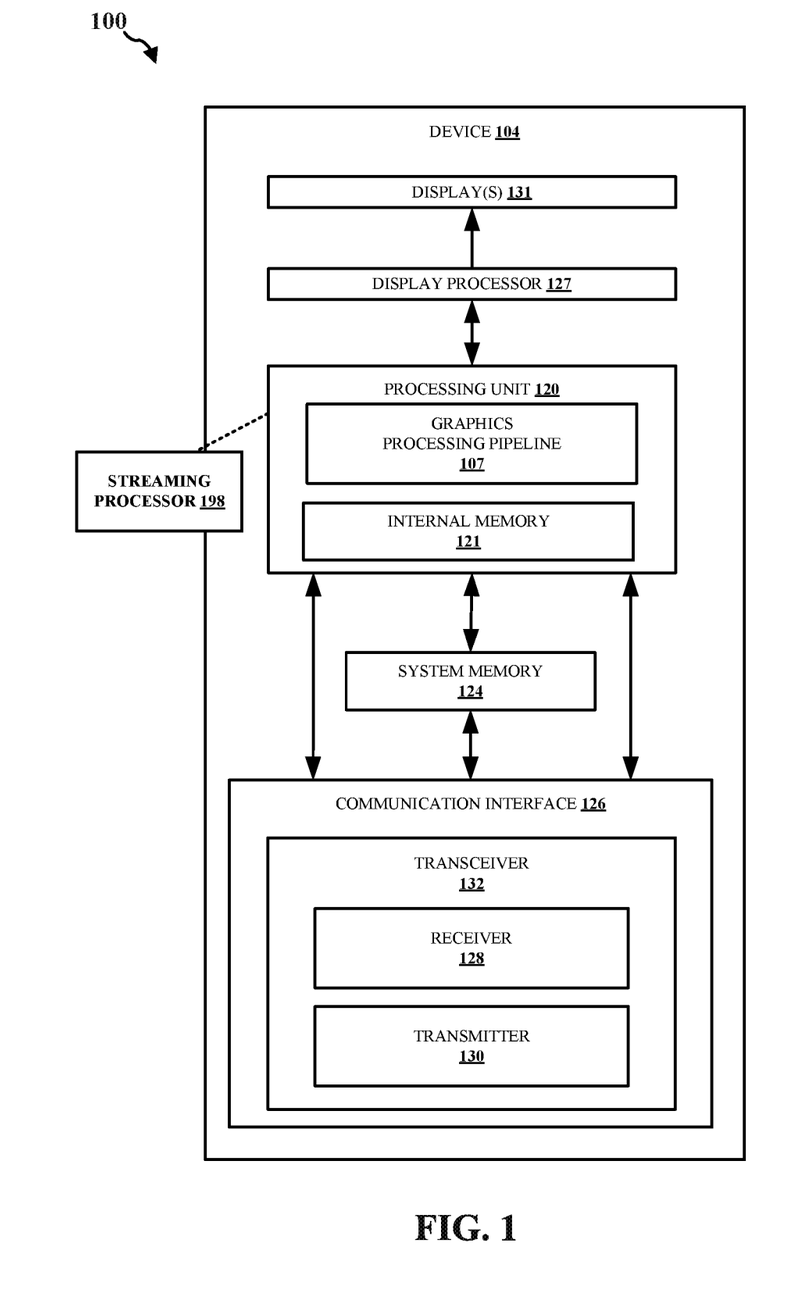
FIG. 1 is a block diagram that illustrates an example content generation system in accordance with one or more techniques of this disclosure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120 and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. For example, the first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. In some examples, the device 104 may include a display processor, such as the display processor 127, to perform one or more display processing techniques on one or more frames generated by the processing unit 120 before the frames are displayed by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled with the system memory 124 over a bus. In some examples, the processing unit 120 may be communicatively coupled with the internal memory 121 over the bus or via a different connection. The internal memory 121 or the system memory 124 may include one or more volatile memories, non-volatile memories, or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a streaming processor (SP) 198 configured to deferring general purpose register (GPR) allocation for results from a processing pipeline. The SP 198 may be configured to identify an instruction group that loads samples to a pipeline for processing texture samples, the instruction group configured to operate on a plurality of waves of samples. The SP 198 may be configured to allocate a persistent GPR (pGPR) for each wave of the instruction group in a first segment of a GPR space. The SP 198 may be configured to allocate one or more block GPR (bGPR) for multiple waves of the instruction group in a second segment of the GPR space, each of the one or more bGPR associated with a credit and a physical slot. The SP 198 may be configured to acquire one credit for the bGPR for execution of the instruction group for a first wave using the pGPR for the first wave and one bGPR to load samples of the first wave to the pipeline. The SP 198 may be configured to refund the one credit for the bGPR upon loading the first wave into the pipeline. The SP 198 may be configured to execute a subsequent wave for the instruction group to load samples to the pipeline when at least one credit is available and the pipeline is processing the first wave. The SP 198 may be configured to store an indication of each wave that has been loaded into the pipeline in a queue. The SP 198 may be configured to return samples for a next wave in the queue from the pipeline to the bGPR for further processing when the physical slot of the bGPR is available.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
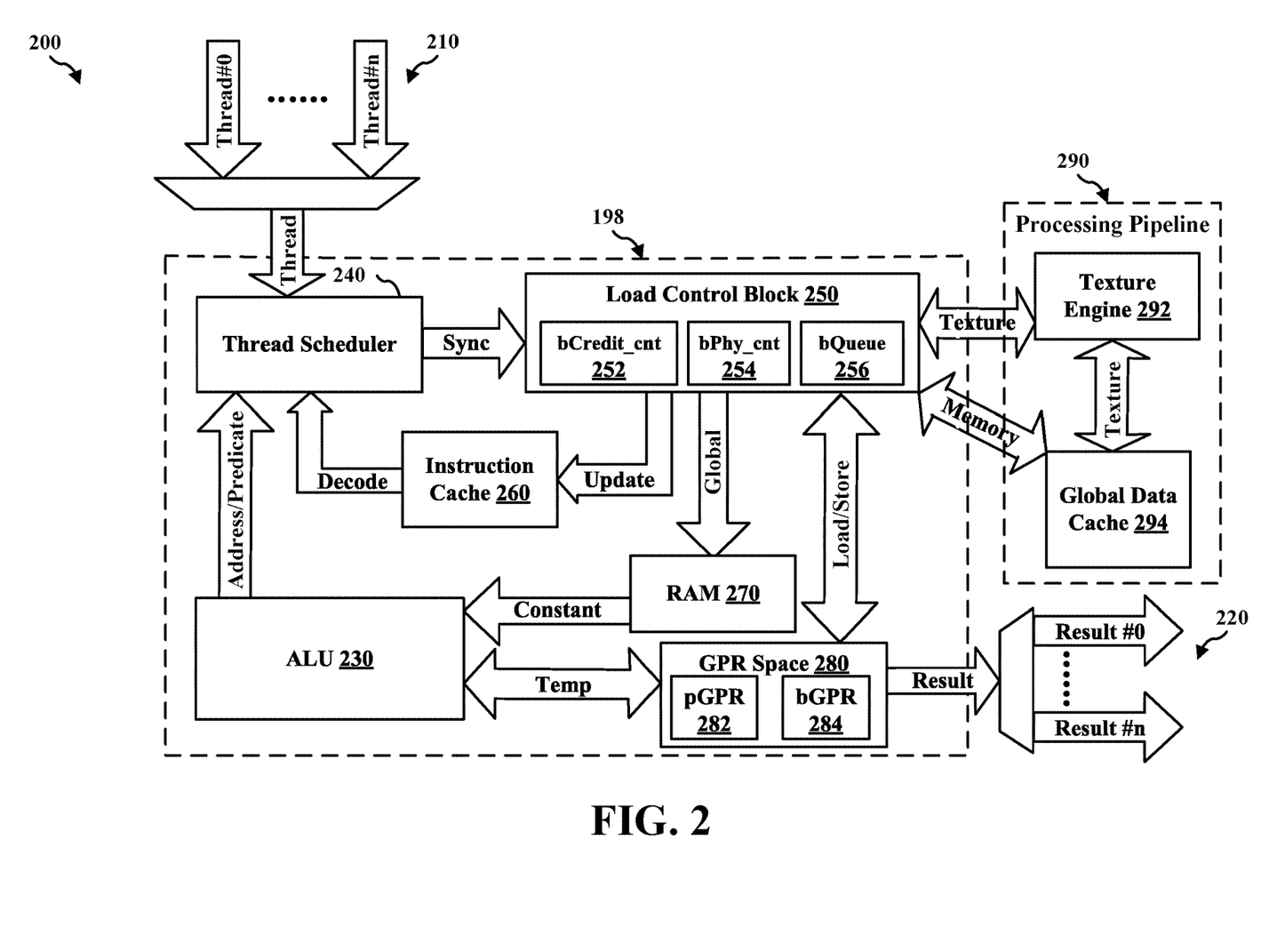
FIG. 2 is a block diagram that illustrates an example streaming processor and processing pipeline, in accordance with one or more techniques of this disclosure.

FIG. 2 is a diagram 200 of an example SP 198. The SP 198 may operate on a plurality of threads 210 to produce results 220. The SP 198 may include an ALU 230, a thread scheduler 240, a load control block 250, an instruction cache 260, a RAM 270, and a GPR space 280. The ALU 230 may perform general processing operations such as executing instructions of the threads 210. The thread scheduler 240 may determine an order for execution of threads 210. In some implementations, the thread scheduler 240 may determine resources for each thread including allocation of GPRs in the GPR space 280. In some implementations, the thread scheduler 240 may divide execution of an instruction group of a thread into multiple waves. The RAM 270 may store values such as constants to be used in the execution of threads 210. The SP 198 and/or the load control block 250 may issue texture samples to a processing pipeline 290, which may include, for example, a texture engine 292 and a global data cache 294. The texture engine 292 may receive the texture samples from the load control block 250 and return processed texture samples to the load control block 250, or store the processed texture samples in the global data cache 294. The SP 198 and/or the load control block 250 may also access global data by loading data directly into or out of global data cache 294. The texture engine 292 may perform processing operations on the texture samples and store the processed texture samples in the global data cache 294. The SP 198 and/or load control block 250 may retrieve the processed texture samples or data from the global data cache 294 and load the processed texture samples or data in the GPR space 280. The load control block 250 may also execute instructions.

The example SP 198 may issue texture samples to the texture engine 292 in a predetermined order, so that corresponding data may be returned to the SP 198 in a same order. For example, if sample zero is issued before sample one, the data for sample zero may be returned to the SP 198 prior to the data for sample one being returned to the SP 198.

Figure 3:
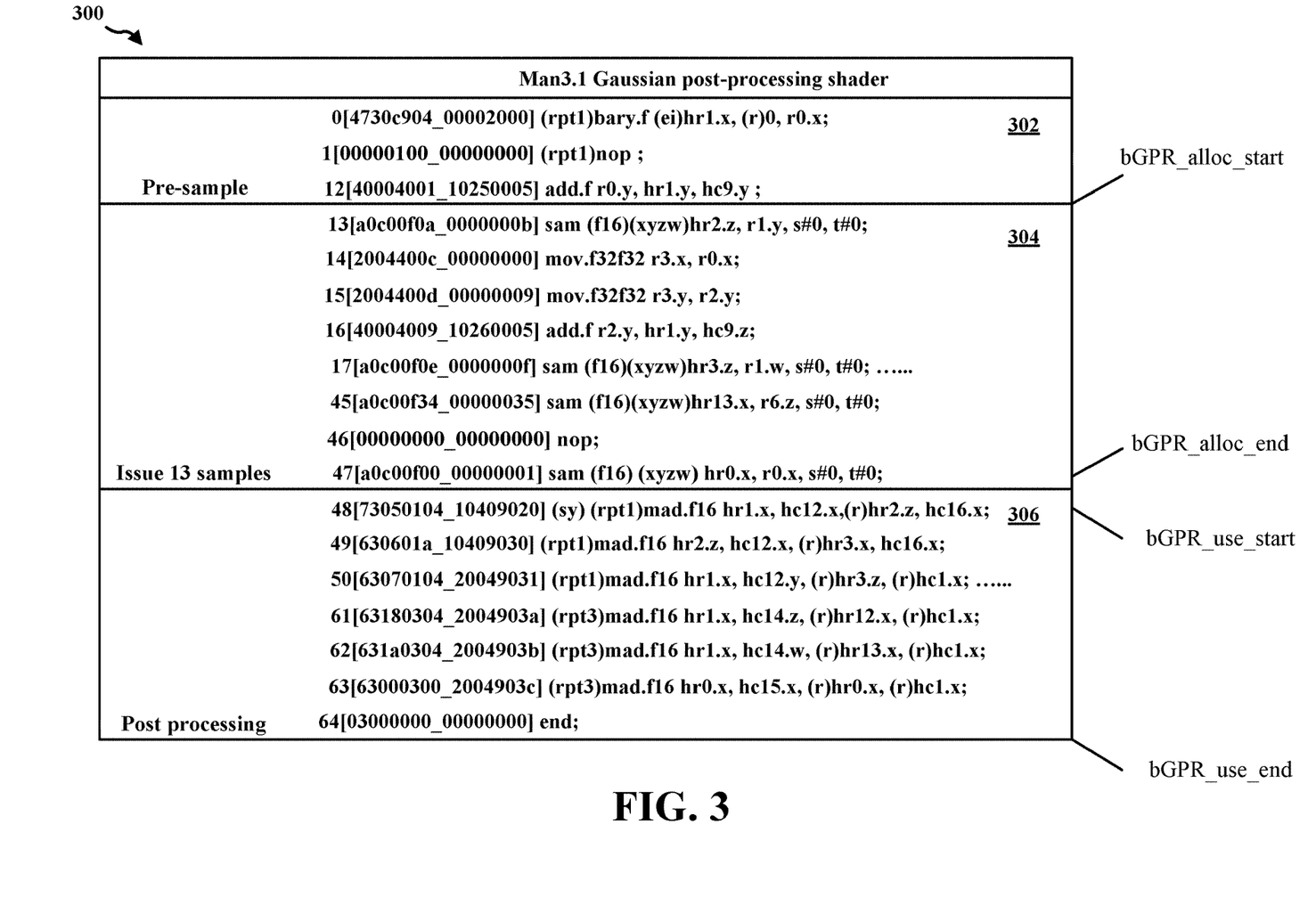
FIG. 3 illustrates an example instruction group including multiple instruction blocks, in accordance with one or more techniques of this disclosure.

FIG. 3 illustrates an example instruction group 300 that may be executed by the SP 198. The instruction group 300 may be a shader having three instruction blocks 302, 304, and 306. The example instruction group 300 may be a Gaussian post-processing shader. The example instruction group 300 may include a pre-sample block 302 for generating (u, v) coordinates for sample instructions, an instruction block 304 for issuing the sample instructions to a processing pipeline 290, and a post-processing block 306 configured to receive texel data from a texture processor (e.g., texture engine 292) that fetches system memory. For example, the instruction block 304 may issue 13 samples to the processing pipeline 290. In an example, a size of the GPR footprint (i.e., size of GPR space 280 for a thread) may be 64 GPRs and the example instruction group 300 may operate on 64 texture samples. Each of the 64 texture samples for the example instruction group 300 may utilize 1 GPR and other processing operations may utilize an additional 5 GPRs. In an aspect, the GPR space 280 may be a limited resource. For instance, the GPR space 280 may be a significant portion of chip space. Lower end processing devices may have a smaller GPR space 280 than higher end devices. Accordingly, the GPR space 280 may create a bottleneck in graphics processing, especially on lower end devices. In an aspect, the present disclose provides techniques for efficiently utilizing GPR space 280 to increase throughput and reduce latency.

In a multi-threaded/multi-waved streaming processor (SP) (e.g., SP 198), the GPR space 280 may include GPRs that may be used to execute threads in parallel and improve performance of the SP. To process, e.g., hundreds of texture samples, the SP may issue to a pipeline hundreds of sample/load requests for corresponding pixels/fibers. Thus, an increased GPR "footprint" may be needed to store data for the hundreds of pixels/fibers and hide at least some of the memory fetch latency. Within the SP, the GPRs may be used to store various types of data (e.g., intermediate temperature values of an ALU, which may be based on a decreased number of texture sample cycles, such as tens of cycles; or texture/memory load data, which may be based on an increased number of texture sample cycles, such as hundreds of cycles, due to a less predictable memory fetch latency). In aspects, GPRs associated with both longer and shorter texture sample cycles may coexist in an instruction block of a shader program (e.g., instruction blocks 302, 304, or 306 in the instruction group 300).

For example, one approach to utilizing GPR space is to process each sample in sequence. By issuing the 64 samples one at a time, GPR demand may be minimized to 1 GPR for all 64 samples. With the additional 5 GPRs for the other processing operations, 6 GPRs may be needed for a single wave, thereby allowing up to 10 waves to be provided in parallel given the 64 GPRs in the GPR footprint. However, based on the number of samples in the instruction block 304 of the example instruction group 300, the memory load latency may be increased by a factor of 13. If such samples are instead grouped to reduce/minimize latency, 18 GPRs may be needed for a single wave (e.g., one GPR for each of the 13 texture samples and an additional 5 GPRs for the other processing operations). In the case of 18 GPRs per wave, only 3 waves may be provided in parallel.

A maximum number of pixels/fibers to be associated with the SP 198 may be determined based on a size of the GPR footprint. As a number of GPRs required by the instruction group 300 increases, fewer pixels/fibers may be active at a same time, because fewer GPRs may be available in the GPR footprint for allocation to the pixels/fibers. To reduce latency, the pixels/fibers may be configured to run in parallel such that more pixels/fibers may be active at the same time, however, parallel processing may increase demand for the GPRs in the GPR footprint. If demand exceeds available GPRs, the SP 198 may wait on memory fetch operations, which may thereby increase a latency of the SP/GPU. Processing efficiencies of the SP may be improved based on parallel execution techniques that may reduce a number of GPRs needed by the instruction group 300 and enable more waves/samples to be issued in accordance with the size of the GPR footprint.

An efficient technique for reducing GPR utilization may be to issue texture samples one at a time (e.g., issue a first texture sample, receive/process data from a first sample return, issue a second texture sample, receive/process data from a second sample return, etc., until a last sample return is received/processed). However, because memory fetching is being performed one at a time, wave/sample execution may be associated with a larger memory fetch latency. Accordingly, parallel waves/samples may be utilized to hide at least some of the memory fetch latency.

To reduce the latency associated with memory fetch operations, a compiler may group some or all of the samples into a block (e.g., when there is no dependency between samples of the group) so that samples of a same wave may be issued in a continuous manner (e.g., one after the other) and data from the sample returns may likewise be received in the continuous manner. In such cases, however, more GPRs may be required from the GPR footprint to store the return data from all the samples of the group, which may require fewer waves to be executed in parallel.

In an example, a shader may be associated with 10 texture samples. If one sample is issued at a time, then only one GPR may need to be utilized from the GPR footprint, since a GPR is not needed to issue the next sample until after the data from the previous sample is returned from the pipeline and processed. Following receipt and processing of the data from the returned sample, a next texture sample may be issued. The GPR utilized for the previous sample may be reused for different/next texture samples. In aspects, latencies caused by the 10 texture samples being issued to the pipeline one at a time may cause an overall latency to be increased by a factor of 10 in comparison to issuing a single sample or a single grouping of samples. In cases where there are hundreds or thousands of samples to be issued, a memory load latency may become very large. Thus, when GPR utilization is reduced/minimized by issuing small sample groups (e.g., individual samples), latency may be increased due to an accumulation of the waiting periods required for the data from each issued sample to be returned from the pipeline.

As an alternative to issuing the texture samples one at a time, the texture samples may be issued by the SP 198 in a group of two or more so that the latency from the sample group may occur at once (e.g., the 10 texture samples may be issued back-to-back without waiting for the data from the corresponding samples to return from the pipeline). Such a scheme may decrease latency, as only the latency of a single sample cycle may be observed, rather than observing the latency from each of the 10 sample cycles, which may increase the latency by a factor of 10. However, because the samples are grouped together, instead of utilizing one GPR to store the data of the sample return, 10 GPRs may need to be utilized when 10 texture samples are included in the issued group of texture samples. Accordingly, if the texture samples are issued one at a time, the number of utilized GPRs may be low but the latency may be high. If the texture samples are issued as a group, the latency may be low but the number of utilized GPRs may be high.

Some shaders may not be configured to issue instructions for every sample cycle. Instead, a shader may include a data dependency in which first data may need to be returned from the pipeline for second data to be properly executed. However, if the samples are grouped together, more GPRs may be utilized from the GPR footprint, resulting in fewer waves/samples that may be processed in parallel. In some aspects, latency costs may need to be balanced against the cost of utilizing a certain number of GPRs from the GPR footprint. For instance, with respect to the example of issuing 10 texture samples, grouping the samples into 5 groups may cause 5 times the latency of a single sample/group of samples, 4 groups may cause 4 times the latency, 3 groups may cause 3 times the latency, and 2 groups may cause 2 times the latency. Determining the number of texture sample groups to issue may, at times, be based on changing conditions that impact the performance of the SP 198. However, a targeted number of sample groups to issue to the pipeline may be based on a decreased/least number of GPRs that may be allocated from the GPR footprint without causing the latency to exceed a latency threshold.

While a compiler may be configured to group the 13 samples in the instruction block 304 into more than one group to increase GPR availability (which may cause latency hiding to be reduced), determining a size of the group may be based on dynamic properties of both a GPR partition and memory access latency. GPRs may be a shared resource among different shaders. A GPR partition of the different shaders may change over time. Memory latency may be similarly impacted by a plurality of factors, such as dynamic memory bandwidth, demand from other clients, memory access locality, etc. In some instances, texture sample grouping may have an impact on memory access locality.

Grouping the samples into a block may provide a mechanism for hardware to issue the samples and receive the returned data back-to-back without spreading the samples of the group across different waves. The hardware may not be configured to determine a start or an end to issuing the sample group. Thus, by including the samples in a block the hardware may identify and process the samples as a group to decrease latency, rather than processing the samples individually. In some examples, GPRs may be allocated when the block is issued and the GPRs may remain allocated for receiving the returned data. In other examples, an allocated GPR may be deallocated after a sample is issued and a same or a different GPR may be reallocated when the corresponding data returns from the pipeline. In this manner, the GPR footprint may include increased GPR availability while the texture samples are in the processing pipeline.

An SP may allocate a number of GPRs needed to store texture and load return data before issuing the texture sample(s) to ensure storage is available for the returned data, which may avoid a deadlock. While such an approach may provide safe assurances of GPR availability for storing the returning data, the approach may be wasteful in that the GPRs are allocated at sample issue but may not be needed until data is returned from the pipeline. A reason for ensuring that GPR storage is available at sample issue may be based on out-of-order systems having different types of memory. For example, if only a first type of memory is available, but unable to accept the returned data, a second type of memory may become blocked. That is, if the first type of data is dependent on the second type of data and the second type of data is blocked, then the first type of data may also become blocked and a deadlock may occur. In aspects, the deadlock may be avoided by ensuring that GPRs are sufficiently allocated at sample issue to store corresponding data that may be returned from the pipeline out-of-order from the issuing order.

In an aspect of the present disclosure, a technique for reducing wasteful GPR allocation may be to process returned data based on an in-order data return pattern of the processing pipeline 290. Data included in a block may be initially arranged in-order within the block. For a data consuming block, the GPRs allocated at sample issue may be deallocated after the sample returns from the processing pipeline 290 to ensure sufficient data storage. Post-processing may be performed, for example, on 10 different types of data based on available instructions and the data may be pushed to a next pipeline without causing a deadlock. As long as there is sufficient GPR availability to consume data as the data returns from the pipeline, more samples may be issued into the pipeline than the allocated GPRs may be configured to accommodate, as the processing pipeline 290 itself may be utilized for holding data in between sample issue and sample return.

A compiler may associate sample load instructions for GPRs with a block-GPR (bGPR) that may be distinguished by the SP 198 from a GPR. For instance, referring back to FIG. 2, the GPR space 280 may be divided into a persistent GPR (pGPR) space 282 and a bGPR space 284. In some implementations, a GPR ID may increase from 0 for the pGPR space 282 and a bGPR ID may decrease from a Max GPR ID (e.g., 47) for the bGPR 284 to provide two logical GPR segments that have non-overlapping boundaries.

The compiler may identify texture or load instruction groups that do not have an internal data dependency as an "issuing block" and insert a pair of new instructions bGPR_alloc_start and bGPR_alloc_end to indicate a bGPR issuing block boundary. For example, a compiler may insert the bGPR_alloc_start instruction before the block 304 and insert the bGPR_alloc_end instruction after the block 304. The compiler may likewise identify texture or load instruction block data associated with a "consuming block" for which texture load return data from the issuing block may be consumed. The compiler may insert a second pair of new instruction bGPR_use_start and bGPR_use_end to indicate a bGPR consuming block boundary. For instance, the compiler may insert the bGPR_use_start instruction before the block 306 and insert the bGPR_use_end at the end of block 306. The compiler may ensure that the texture or load instruction issuing block and consuming block do not overlap.

Figure 4:
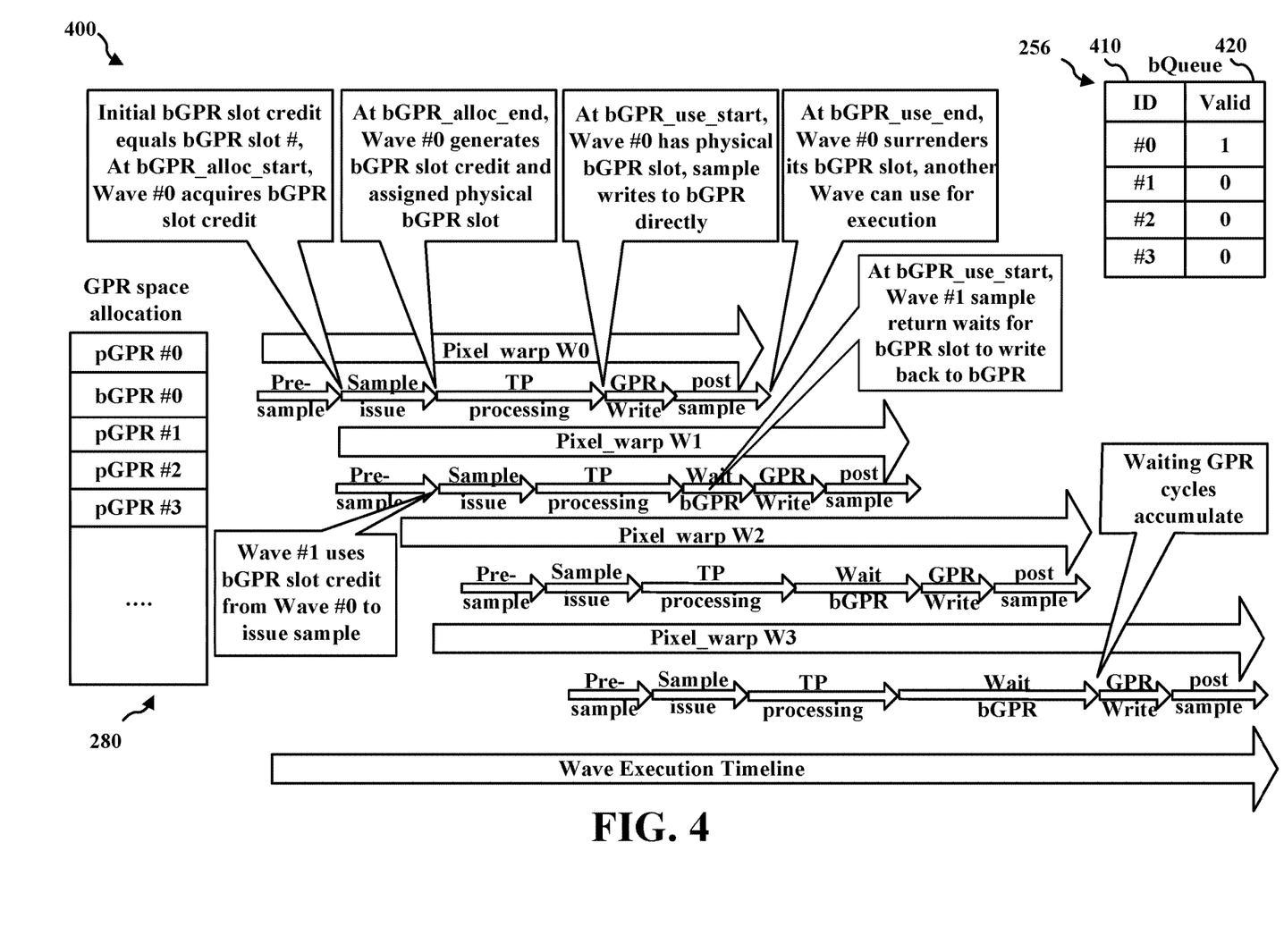
FIG. 4 is a processing chart that illustrates an example processing timeline utilizing a single block general purpose register (bGPR), in accordance with one or more techniques of this disclosure.
Figure 5:
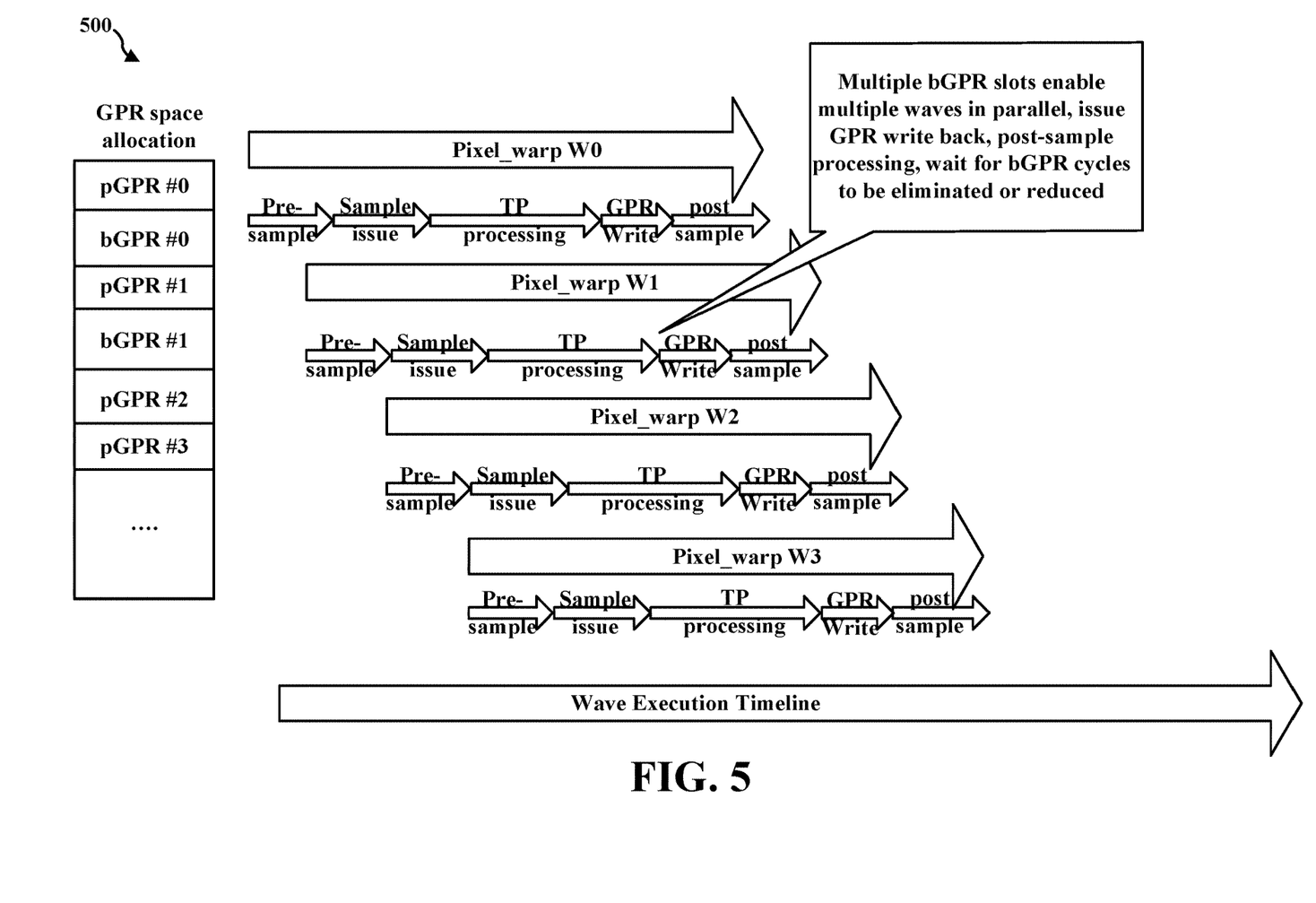
FIG. 5 is a processing chart that illustrates an example processing timeline utilizing a multiple bGPR, in accordance with one or more techniques of this disclosure.
Figure 6:
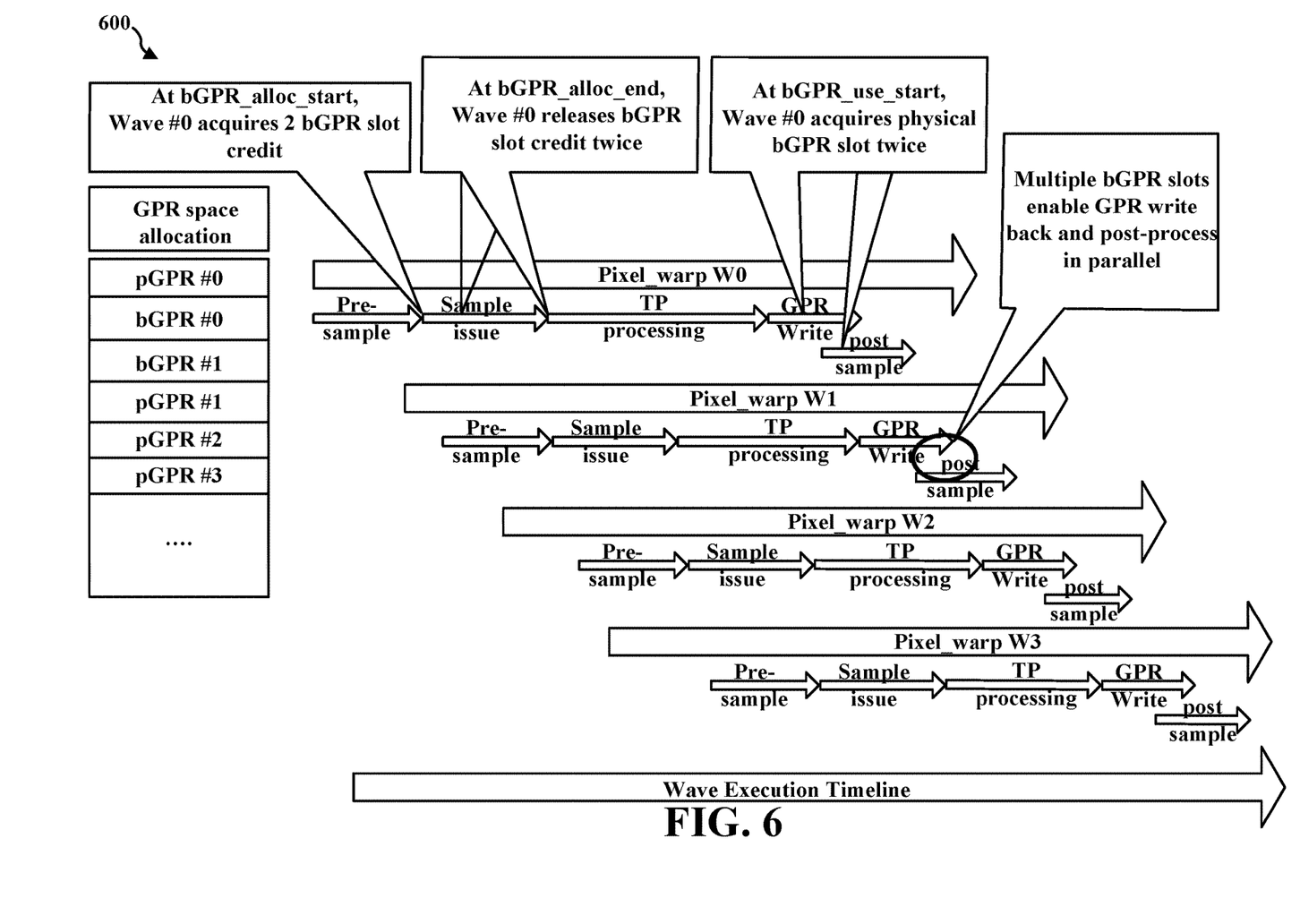
FIG. 6 is a processing chart that illustrates an example processing timeline utilizing a multiple sub-bGPR in accordance with one or more techniques of this disclosure.

FIGS. 4-6 illustrate processing charts 400, 500, and 600, respectively, for utilizing a GPR space 280 including a bGPR partition. The processing chart 400 is associated with use of a single bGPR slot, the processing chart 500 is associated with use of multiple bGPR slots, and the processing chart 600 is associated with use of sub-bGPR slots. The SP 198 may modify the GPR space 280 to provide logical segments that include a persistent-GPR (pGPR) slot 282 that may be used for an individual wave and a volatile bGPR slot 284 that may be shared by multiple active waves. The pGPR slot 282 may be statically allocated before a wave executes the shader program. The bGPR slot 284 may be dynamically allocated and retired during wave execution of the shader program. For simplification, the bGPR slot footprint may be static per shader. The SP 198 and/or load control block 250 may include a bGPR slot credit counter (e.g., bCredit_cnt 252), a bGPR physical slot counter (e.g., bPhy_cnt 254), and/or a bGPR slot order queue (e.g., bQueue 256).

The GPRs may be grouped into bGPR slots. In an example, 10 waves may be issued based on 10 bGPR slots. In another example, 10 waves may be issued based on 1 bGPR slot. Data may be pushed into the processing pipeline 290 in accordance with any of such schemes or other schemes. For texture processing, the processing pipeline 290 may be long in that the processing pipeline 290 may include a large amount of buffer and cache for storing data. For example, if 10 texture samples are pushed into the processing pipeline 290 by the SP 198 but the processing pipeline 290 is large enough to hold 500 samples, more samples may be issued/pushed into the processing pipeline 290 against the 500 sample capacity of the processing pipeline 290. In an aspect of the present disclosure, a credit system may be utilized to track availability of GPRs for samples that are currently in the pipeline. For example, credits may be provided for data that is in between sample issue and sample return based on an assumption that the pipeline is long enough to store all samples for a wave. Accordingly, the GPRs allocated for a first wave may be reused to issue samples for a subsequent wave while the samples for the first wave are in the processing pipeline 290. The GPR may then be available when the processing pipeline 290 finishes the first wave.

Referring to the processing chart 400, in configurations, the SP 198 may provide 1 bGPR slot (bGPR #0) and 4 pGPR (pGPR #0-#3) slots for four waves (W0-W3). For example, the instruction group 300 may be executed on 4 waves of samples. An initial bGPR slot credit may correspond to the single bGPR slot. For example, bCredit_cnt 252 and bPhy_cnt 254 may both equal 1 and bQueue 256 may be empty. When the SP 198 starts execution of wave 0 and reaches the bGPR_alloc_start instruction, 1 bGPR slot credit may be requested and acquired for wave 0. A wave 0 ID may be pushed to the bQueue 256 and the bCredit_cnt 252 may be decreased by 1. After wave 0 executes the bGPR_alloc_end instruction, 1 bGPR slot credit may be returned and bCredit_cnt 252 may increase by 1. Accordingly, wave 1 may use the bGPR slot to execute bGPR_alloc_start instruction. Otherwise, wave 1 may be delayed until bCredit_cnt 252 is not equal to zero. Wave 1 may surrender the bGPR slot credit to wave 2 after execution of the bGPR_alloc_end instruction. The system may then move onto wave 3. In this manner, one bGPR slot credit may enable 4 waves to issue texture sample blocks continuously.

A bQueue 256 with multiple entries to log waves that acquire a bGPR slot credit may be generated via hardware. For example, as illustrated in FIG. 4, the bQueue 256 may store a wave identifier (ID) 410 and a validity status 420 for each wave in the processing pipeline 290. The wave ID 410 may indicate an order of the wave. For example, as illustrated, wave ID #0 refers to the first wave and wave ID #3 refers to a fourth wave. An order of the waves using the bGPR slot credit may be a same order that the bGPR slot data is returned. Each bQueue entry may include the validity status 420, which may be represented as one valid status bit. When wave 0 sample data returns from the processing pipeline 290, a bPhy_cnt 254 may not be zero (i.e., may be the initial value equal to a number of bGPR slots), so the bGPR slot may be available. The SP 198 may update a top entry of the bQueue 256 validity status 420 from invalid to valid (as shown in FIG. 4) and decrease bPhy_cnt 254 by 1. Wave 0 return data may be written to the bGPR space 284. When wave 0 executes the bGPR_use_start instruction, the SP 198 may determine a status of a corresponding bGPR slot entry. If the status is valid, execution may continue. Otherwise the SP 198 may wait until after wave 0 executes the bGPR_use_end instruction, removes wave 0 from the bQueue 256, and increases bPhy_cnt 254 by 1. Return data of wave 1 may then be written to the bGPR space 284.

Based on the processing chart 400 and the instruction group 300, the pGPR footprint may be 5 and the bGPR footprint may be 13. A GPR footprint size of 64 may allow 1 bGPR slot and 10 pGPR slots to enable 10 waves in parallel. 10 waves times 5 GPR for pGPR plus 13 GPR for 1 equals 63 GPR footprint, which is less than the GPR footprint size of 64. Each wave may only need 1 cycle of latency hiding to hide the memory fetch latency. Accordingly, use of the bGPR may reduce a total GPR footprint size for a thread while also reducing latency.

Referring to FIG. 5 and the processing chart 500, in examples, multiple bGPR slots may enable one wave to write bGPR slot data and another wave to execute the consuming block in parallel. For example, wave 0 may perform the post sample operation while wave 1 performs the GPR write operation. By the time wave 0 finishes the post sample operation and is removed from the bQueue 256, wave 1 may have started the post sample operation, and the processing pipeline may have finished wave 2. Accordingly, wave 2 may start the GPR write operation using the bGPR slot release by wave 0. Latency of waiting for an available bGPR slot as in FIG. 4 may be reduced or eliminated. Using the above example GPR footprints, such an allocation may allow the SP 198 to allocate 2 bGPR slots and enable 7 waves (2 bGPR slots*13 GPR+7 wave*5 GPR=61<64) to execute in parallel based on the processing chart 500 and the instruction group 300.

Referring to FIG. 6, the processing chart 600 may be associated with a bGPR slot that is divided into two smaller bGPR slots (e.g., sub-bGPR slots). Two sub-bGPR slots may allow a wave to write to a bGPR and execute the consuming block in parallel. Based on the processing chart 600 and the instruction group 300, the bGPR footprint may be 7, as the SP may allocate 2 sub-bGPR slots and enable 10 waves to execute in parallel. (2 sub-bGPR slots*7 GPR+10 waves*5 GPR=64). The bGPR slot system may provide an efficient technique for improving GPR utilization by sharing GPR space and deferring GPR allocation for sample/load instruction return data. Such techniques may decrease complexities of the compiler when balancing the GPR footprint size against the number of sample/load instruction groups.

Accordingly, an in-order nature of issuing the texture samples to the processing pipeline 290 may allow a credit system to be implemented that issues credits based on the number of samples currently in the pipeline. The issued credits may be used to ensure that when samples return from the pipeline there is sufficient GPR availability to receive the data and push the data to a next pipeline. For example, GPRs may not be needed for texture samples as the texture samples move through the processing pipeline 290. Thus, by considering the pipeline as storage space, more texture samples may be issued than the allocated GPRs may be configured to store. For bGPRs, a slot may be shared among multiple waves. For instance, one bGPR may be allocated for 10 waves to share. Accordingly, for any given GPR space, additional samples may be issued in parallel based on the pipeline and the credit system.

Figure 7:
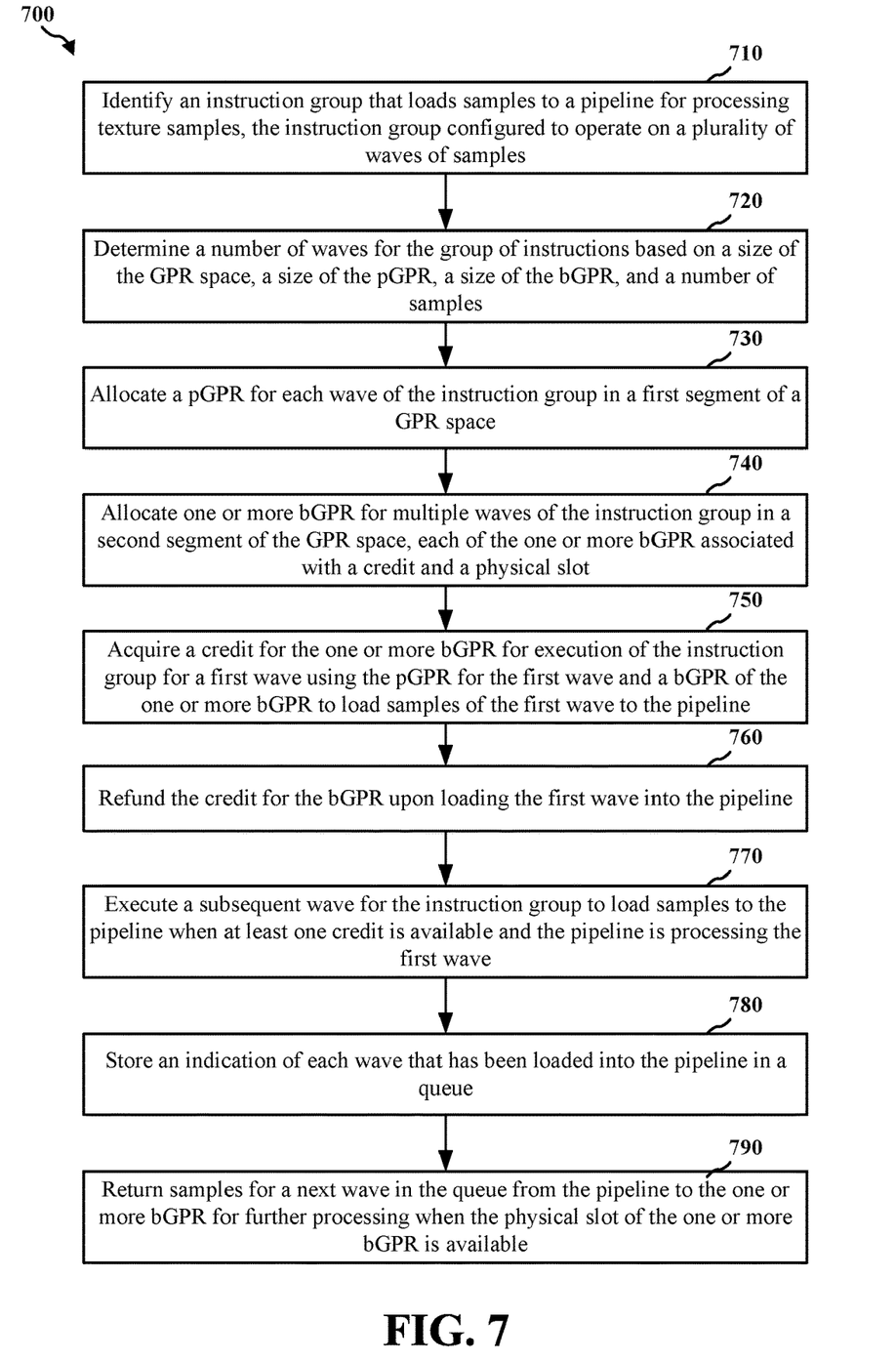
FIG. 7 is a flowchart of an example method of deferring general purpose register (GRP) allocation in accordance with one or more techniques of this disclosure.

FIG. 7 is a flowchart of an example method 700 in accordance with one or more techniques of this disclosure. The method 700 may be performed by a frame composer, a display processor, a DPU, a GPU, a CPU or any other type of processor, an apparatus for graphics processing, a wireless communication device, and the like, as used in connection with the examples of FIGS. 1-6. The flowchart is merely an example, and the order can be changed and/or steps can be added or removed.

At block 710, the method 700 may include identifying an instruction group that loads samples to a pipeline for processing texture samples. The instruction group may be configured to operate on a plurality of waves of samples. In an aspect, for example, the thread scheduler 240 may identify an instruction group 300 that loads samples to the pipeline 290 for processing texture samples. In some implementations, the instruction group 300 includes pre-processing instructions (e.g., instruction block 302 including the bGPR_alloc-start instruction) configured to acquire the one credit, pipeline issuing instructions (e.g., instruction block 304 including the bGPR_alloc_end instruction) configured to refund the credit, and post processing instructions (e.g. instruction block 306 including the bGPR_use_start and bGPR_use_end instructions) configured to determine availability of the physical slot of the bGPR. The instruction group 300 may be a shader.

At block 720, the method 700 may include determining a number of waves for the instruction group based on a size of the GPR space, a size of the pGPR, a size of the bGPR, and a number of samples. In an aspect, for example, the thread scheduler 240 may determine a number of waves for the instruction group 300 based on a size of the GPR space 280, a size of the pGPR 282, a size of the bGPR 284, and a number of samples. For example, the thread scheduler 240 may attempt to maximize a number of parallel waves while keeping a size of the pGPR 282 times the number of waves plus the size of the bGPR 284 times a number of the bGPR 284 less than or equal to the size of the GPR space 280 or an available portion thereof. Accordingly, the thread scheduler 240 may maximize the number of parallel waves that use the available GPRs in order to minimize latency associated with memory fetch operations.

At block 730, the method 700 may include allocating a pGPR for each wave of the instruction group in a first segment of a GPR space. In an aspect, for example, the load control block 250 may allocate a pGPR 282 for each wave of the instruction group 300 in a first segment of a GPR space 280.

At block 740, the method 700 may include allocating one or more bGPR for multiple waves of the instruction group in a second segment of the GPR space, each of the one or more bGPR associated with a credit and a physical slot. In an aspect, for example, the thread scheduler 240 may allocate one or more bGPR 284 for multiple waves of the instruction group 300 in a second segment of the GPR space 280. Each of the one or more bGPR 284 may be associated with a credit (e.g., bCredit_cnt 252) and a physical slot (e.g., bPhy_cnt 254).

At block 750, the method 700 may include acquiring a credit for the one or more bGPR for execution of the instruction group for a first wave using the pGPR for the first wave and a bGPR of the one or more bGPR to load samples of the first wave to the pipeline. In an aspect, for example, the load control block 250 may acquire one credit for the bGPR for execution of the instruction group 300 for a first wave using the pGPR 282 for the first wave and one bGPR 284 to load samples of the first wave to the pipeline 290. Acquiring the credit may include determining whether a credit count (e.g., bCredit_cnt 252) for the one or more bGPR is greater than zero. If the credit count is greater than 0, the load control block 250 may reduce the credit count by one. An initial value of the credit count may be equal to a number of the one or more bGPR 284. If the credit count is 0, SP 198 may wait to start execution of the instruction group for the wave.

At block 760, the method 700 may include refunding the credit for the one or more bGPR upon loading the first wave into the pipeline. In an aspect, for example, the load control block 250 may refund the credit for the bGPR 284 upon loading the first wave into the pipeline 290. For example, the load control block 250 may increment the bCredit_cnt 252.

At block 770, the method 700 may include executing a subsequent wave for the instruction group to load samples to the pipeline when at least one credit is available and the pipeline is processing the first wave. In an aspect, for example, the ALU 230 may execute a subsequent wave for the instruction group 300 to load samples to the pipeline 290 when at least one credit (e.g., bCredit_cnt 252>0) is available and the pipeline 290 is processing the first wave.

At block 780, the method 700 may include storing an indication of each wave that has been loaded into the pipeline in a queue. In an aspect, for example, the bQueue 256 may store an indication of each wave (e.g., ID 410) that has been loaded into the pipeline in a queue.

At block 790, the method 700 may include returning samples for a next wave in the queue from the pipeline to the one or more bGPR for further processing when the physical slot of the one or more bGPR is available. In an aspect, for example, the load control block 250 may return samples for a next wave in the bQueue 256 from the pipeline 290 to the bGPR 284 for further processing (e.g., by the ALU 230) when the physical slot of the one or more bGPR 284 is available.

Figure 8:
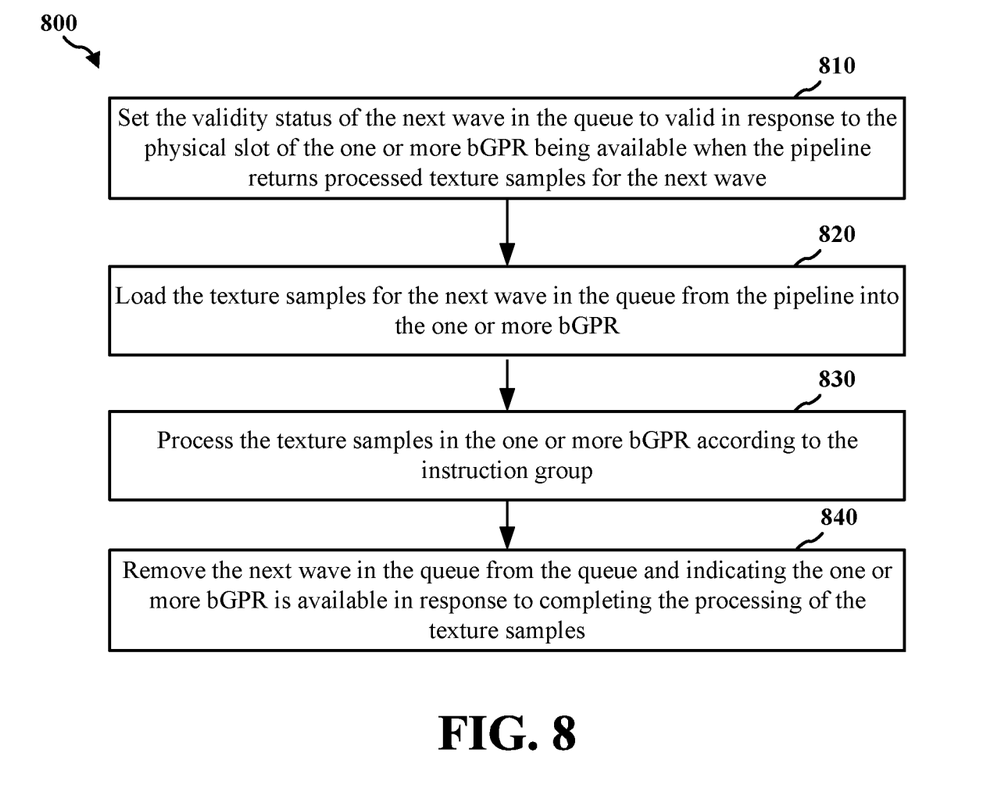
FIG. 8 is a flowchart of an example method of returning samples from a processing pipeline to a bGPR for further processing in accordance with one or more techniques of this disclosure.

FIG. 8 is a flowchart of an example method 800 in accordance with one or more techniques of this disclosure. The method 700 may be performed by a frame composer, a display processor, a DPU, a GPU, a CPU, an apparatus for graphics processing, a wireless communication device, and the like, as used in connection with the examples of FIGS. 1-6. The method 800 may correspond to the block 780 of the method 700. The flowchart is merely an example, and the order can be changed and/or steps can be added or removed.

At block 810, the method 800 may include setting the validity status 420 of the next wave in the queue (e.g., bQueue 256) to valid (e.g., 1) in response to the physical slot of the bGPR 284 being available when the pipeline 290 returns processed texture samples for the next wave. At block 820, the method 800 may include loading the texture samples for the next wave in the queue (e.g., bQueue 256) from the pipeline 290 into the bGPR 284. At block 830, the method 800 may include processing the texture samples in the bGPR 284 according to the instruction group 300. For example, the ALU 230 may process the texture samples in the bGPR 284 according to the instruction block 306. In some implementations (e.g., as illustrated in FIG. 5), the one or more bGPR 284 include at least two bGPR, and the further processing is performed in parallel for at least two waves using the at least two bGPR. In some implementations (e.g., as illustrated in FIG. 6), the one or more bGPR 284 include sub-bGPR slots. Returning samples from the pipeline to the physical slot of the bGPR in block 820 and the further processing in block 830 may be performed in parallel for a wave. At block 840, the method 800 may include removing the next wave in the queue (e.g., bQueue 256) from the queue and indicating the bGPR 284 is available in response to completing the processing. For example, the load control block 250 may increment the bPhy_cnt 254 such that the bPhy_cnt 254 is greater than 0.

In view of the foregoing, the credit system of the current application may allow a single bGPR to be used to load multiple waves of samples to a processing pipeline consecutively and to receive the multiple processed waves of samples from the pipeline. By loading waves of samples consecutively, latency associated with memory fetch operations may be reduced. Additionally, use of the single bGPR for multiple waves may reduce a GPR footprint of the instruction group or allow additional waves to be executed in parallel. Accordingly, the techniques of the present disclosure may improve throughput and reduce latency of graphics processing operations, thereby providing improvement in metrics such as frame rate.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

Various examples have been described. These and other examples are within the scope of the following claims.

What is claimed is:

1. A method of deferring general purpose register (GPR) allocation, comprising:
    identifying an instruction group that loads samples to a pipeline for processing texture samples, the instruction group configured to operate on a plurality of waves of samples;
    allocating a persistent GPR (pGPR) for each wave of the instruction group in a first segment of a GPR space;
    allocating one or more block GPR (bGPR) for multiple waves of the instruction group in a second segment of the GPR space, each of the one or more bGPR associated with a credit and a physical slot;
    acquiring a credit for the one or more bGPR for execution of the instruction group for a first wave using the pGPR for the first wave and a bGPR of the one or more bGPR to load samples of the first wave to the pipeline;
    refunding the credit for the one or more bGPR upon loading the first wave into the pipeline;
    executing a subsequent wave for the instruction group to load samples to the pipeline when at least one credit is available and the pipeline is processing the first wave;
    storing an indication of each wave that has been loaded into the pipeline in a queue; and
    returning samples for a next wave in the queue from the pipeline to the one or more bGPR for further processing when the physical slot of the one or more bGPR is available.

2. The method of claim 1, wherein the queue stores a wave identifier and a validity status, the method further comprising:
    setting the validity status of the next wave in the queue to valid in response to the physical slot of the one or more bGPR being available when the pipeline returns processed texture samples for the next wave;
    loading the texture samples for the next wave in the queue from the pipeline into the one or more bGPR;
    processing the texture samples in the one or more bGPR according to the instruction group; and removing the next wave in the queue from the queue and indicating the one or more bGPR is available in response to completing the processing of the texture samples.

3. The method of claim 1, wherein the one or more bGPR include at least two bGPR, and wherein the further processing is performed in parallel for at least two waves using the at least two bGPR.

4. The method of claim 1, wherein the one or more bGPR include sub-bGPR slots, wherein returning samples for a next wave in the queue from the pipeline to the one or more bGPR and the further processing is performed in parallel for the next wave.

5. The method of claim 1, wherein the instruction group includes pre-processing instructions configured to acquire the credit, pipeline issuing instructions configured to refund the credit, and post processing instructions configured to determine availability of the physical slot of the bGPR.

6. The method of claim 1, wherein the instruction group is a shader.

7. The method of claim 1, wherein acquiring the credit for the one or more bGPR comprises:
determining whether a credit count for the one or more bGPR is greater than zero; and
reducing the credit count by one when the credit count is greater than zero, wherein an initial value of the credit count is equal to a number of the one or more bGPR.

8. The method of claim 7, further comprising waiting to start execution of the instruction group for the first wave when the credit count is zero.

9. The method of claim 1, further comprising determining a number of waves for the instruction group based on a size of the GPR space, a size of the pGPR, a size of the bGPR, and a number of samples.

10. An apparatus for frame processing, the apparatus including a graphics processing unit (GPU), comprising:
a memory; and
at least one processor coupled to the memory and configured to:
identify an instruction group that loads samples to a pipeline for processing texture samples, the instruction group configured to operate on a plurality of waves of samples;
allocate a persistent GPR (pGPR) for each wave of the instruction group in a first segment of a GPR space;
allocate one or more block GPR (bGPR) for multiple waves of the instruction group in a second segment of the GPR space, each of the one or more bGPR associated with a credit and a physical slot;
acquire a credit for the one or more bGPR for execution of the instruction group for a first wave using the pGPR for the first wave and a bGPR of the one or more bGPR to load samples of the first wave to the pipeline;
refund the credit for the one or more bGPR upon loading the first wave into the pipeline;
execute a subsequent wave for the instruction group to load samples to the pipeline when at least one credit is available and the pipeline is processing the first wave;
store an indication of each wave that has been loaded into the pipeline in a queue; and
return samples for a next wave in the queue from the pipeline to the one or more bGPR for further processing when the physical slot of the one or more bGPR is available.

11. The apparatus of claim 10, wherein the queue stores a wave identifier and a validity status, the at least one processor further configured to:

set the validity status of the next wave in the queue to valid in response to the physical slot of the one or more bGPR being available when the pipeline returns processed texture samples for the next wave;
load the texture samples for the next wave in the queue from the pipeline into the one or more bGPR;
process the texture samples in the one or more bGPR according to the instruction group; and
remove the next wave in the queue from the queue and indicate the one or more bGPR is available in response to completing the processing of the texture samples.

12. The apparatus of claim 10, wherein the one or more bGPR include at least two bGPR, and wherein the further processing is performed in parallel for at least two waves using the at least two bGPR.

13. The apparatus of claim 10, wherein the one or more bGPR include sub-bGPR slots, wherein the at least one processor is configured to return samples for a next wave in the queue from the pipeline to the one or more bGPR and perform the further processing in parallel for the next wave.

14. The apparatus of claim 10, wherein the instruction group includes pre-processing instructions configured to acquire the credit, pipeline issuing instructions configured to refund the credit, and post processing instructions configured to determine availability of the physical slot of the bGPR.

15. The apparatus of claim 10, wherein the instruction group is a shader.

16. The apparatus of claim 10, wherein the at least one processor is configured to acquire one credit for the one or more bGPR for execution of the instruction group by:
determining whether a credit count for the one or more bGPR is greater than zero; and
reducing the credit count by one when the credit count is greater than zero, wherein an initial value of the credit count is equal to a number of the one or more bGPR.

17. The apparatus of claim 16, wherein the at least one processor is configured to wait to start execution of the instruction group for the first wave when the credit count is zero.

18. The apparatus of claim 10, wherein the at least one processor is configured to determine a number of waves for the group of instructions based on a size of the GPR space, a size of the pGPR, a size of the bGPR, and a number of samples.

19. The apparatus of claim 10, wherein the apparatus is a wireless communication device.

20. A non-transitory computer-readable medium storing computer executable code, the code when executed by a processor of a graphics processing unit (GPU), causes the processor to:
identify an instruction group that loads samples to a pipeline for processing texture samples, the instruction group configured to operate on a plurality of waves of samples;
allocate a persistent GPR (pGPR) for each wave of the instruction group in a first segment of a GPR space;
allocate one or more block GPR (bGPR) for multiple waves of the instruction group in a second segment of the GPR space, each of the one or more bGPR associated with a credit and a physical slot;
acquire a credit for the one or more bGPR for execution of the instruction group for a first wave using the pGPR for the first wave and a bGPR of the one or more bGPR to load samples of the first wave to the pipeline;

refund the credit for the one or more bGPR upon loading the first wave into the pipeline;
execute a subsequent wave for the instruction group to load samples to the pipeline when at least one credit is available and the pipeline is processing the first wave;
store an indication of each wave that has been loaded into the pipeline in a queue; and
return samples for a next wave in the queue from the pipeline to the one or more bGPR for further processing when the physical slot of the one or more bGPR is available.

\* \* \* \* \*